(12) United States Patent
Bailey et al.

(10) Patent No.: US 12,442,812 B2
(45) Date of Patent: Oct. 14, 2025

(54) SUPPORT STRUCTURE INSPECTION DEVICES, SYSTEMS AND METHODS

(71) Applicant: Hubbell Incorporated, Shelton, CT (US)

(72) Inventors: Christopher Lane Bailey, Greenville, SC (US); Timothy Eugene Willis, Clemson, SC (US); Douglas Matthew Hamilton, Arlington Heights, IL (US)

(73) Assignee: Hubbell Incorporated, Shelton, CT (US)

(*) Notice: Subject to any disclaimer, the term of this patent is extended or adjusted under 35 U.S.C. 154(b) by 1033 days.

(21) Appl. No.: 16/561,172

(22) Filed: Sep. 5, 2019

(65) Prior Publication Data

US 2020/0072814 A1   Mar. 5, 2020

Related U.S. Application Data

(60) Provisional application No. 62/864,065, filed on Jun. 20, 2019, provisional application No. 62/735,370, (Continued)

(51) Int. Cl.
*G01N 33/46* (2006.01)
*G01N 3/06* (2006.01)
(Continued)

(52) U.S. Cl.
CPC ............. *G01N 33/46* (2013.01); *G01N 3/066* (2013.01); *G01N 27/02* (2013.01); *G01N 29/045* (2013.01);
(Continued)

(58) Field of Classification Search
CPC ........ G01N 33/46; G01N 3/066; G01N 27/02; G01N 29/045
(Continued)

(56) References Cited

U.S. PATENT DOCUMENTS 3,066,525 A   12/1962  Harris
3,345,861 A   10/1967  Heath
(Continued)

FOREIGN PATENT DOCUMENTS

KR   100847124 B1 *  7/2008  ............. H02G 7/205

OTHER PUBLICATIONS

Smith, Anthony, and Eric T. Matson. "Use of antennas as sensors to discover signals to form mobile broadband networks." Sensors, 2009 IEEE. IEEE, 2009. (Year: 2009).*
(Continued)

*Primary Examiner* — Paul D Lee
(74) *Attorney, Agent, or Firm* — Robinson + Cole LLP

(57) ABSTRACT

Devices, systems, and methods for support structure inspection are provided. In one example implementation, a system can include one or more sensors configured to obtain data associated with a condition of a support structure, such as a utility pole. The system can include one or more processors. The system can include a communication circuit operable to communicate a data packet to a remote device. The data packet can include a payload generated based at least in part on the data associated with the condition of the utility pole. The system can include a power source operable to provide electrical power to the one or more sensors, one or more processors, and the communication circuit.

20 Claims, 8 Drawing Sheets

Related U.S. Application Data filed on Sep. 24, 2018, provisional application No. 62/727,021, filed on Sep. 5, 2018.

(51) Int. Cl.
  *G01N 27/02* (2006.01)
  *G01N 29/04* (2006.01)
  *G01M 5/00* (2006.01)

(52) U.S. Cl.
  CPC ........ *G01M 5/0025* (2013.01); *G01M 5/0033* (2013.01)

(58) Field of Classification Search
  USPC .......................................................... 702/34
  See application file for complete search history.

(56) References Cited

U.S. PATENT DOCUMENTS

| | | | |
|---|---|---|---|
| 3,361,225 A | 1/1968 | Nichols | |
| 3,521,483 A | 7/1970 | Miller et al. | |
| 3,531,983 A | 10/1970 | Heath et al. | |
| 3,574,681 A | 4/1971 | Cecil | |
| 3,877,294 A | 4/1975 | Shaw | |
| 4,399,701 A | 8/1983 | Dunlop | |
| 5,567,871 A | 10/1996 | Sandoz | |
| 6,647,801 B1 | 11/2003 | Deuar | |
| 7,418,866 B2 | 9/2008 | Wang | |
| 7,640,817 B2 | 1/2010 | Sandoz | |
| 7,743,668 B2 | 6/2010 | Deuar | |
| 7,769,131 B2 | 8/2010 | Wallace | |
| 8,059,006 B2 | 11/2011 | Schweitzer et al. | |
| 8,073,106 B2 | 12/2011 | Wallace | |
| 8,630,813 B2 | 1/2014 | Piazza | |
| 9,167,516 B2 | 10/2015 | Arendas | |
| 9,267,925 B2 | 2/2016 | Bartuli et al. | |
| 9,356,721 B2 | 5/2016 | Haulin | |
| 9,869,622 B2 | 1/2018 | More et al. | |
| 9,983,254 B2 | 5/2018 | McCammon et al. | |
| 9,983,313 B2 | 5/2018 | Knibble | |
| 10,871,003 B2 * | 12/2020 | Pham | E04H 12/20 |
| 11,079,347 B1 * | 8/2021 | Beasley | G01M 3/186 |
| 2004/0261526 A1 * | 12/2004 | Poole | G01N 27/223 73/335.06 |
| 2010/0169017 A1 * | 7/2010 | Dufaux | G01W 1/14 73/170.19 |
| 2010/0328849 A1 * | 12/2010 | Ewing | G06F 1/266 361/622 |
| 2014/0278150 A1 | 9/2014 | Baesler et al. | |
| 2014/0300344 A1 * | 10/2014 | Turner | G01R 21/133 324/107 |
| 2015/0233806 A1 * | 8/2015 | More | G01N 3/42 73/85 |
| 2016/0105021 A1 * | 4/2016 | Murray | G02B 6/4278 385/75 |
| 2016/0313209 A1 * | 10/2016 | Van Zee | G01M 5/0066 |
| 2016/0371657 A1 * | 12/2016 | Butera | G06Q 10/063 |
| 2017/0102234 A1 | 4/2017 | Oshetski et al. | |
| 2017/0138978 A1 | 5/2017 | Williams | |
| 2017/0227596 A1 | 8/2017 | Sozer et al. | |
| 2018/0211774 A1 | 7/2018 | McCammon et al. | |
| 2018/0375316 A1 * | 12/2018 | Greco | H02G 7/20 |
| 2019/0227112 A1 * | 7/2019 | Keshet | G01R 31/088 |
| 2020/0370323 A1 * | 11/2020 | Pham | H02G 7/05 |

OTHER PUBLICATIONS

PCT International Search Report and Written Opinion for corresponding PCT Application No. PCT/US19/49675, mailed on Dec. 4, 2019, 8 pages.

Kinectrics-Life Cycle Management Solutions for the Electricity Industry—Tower Vibration Monitoring Case Study: http://www.kinectrics.com/Case-Studies/Pages/Tower-Vibration-Monitoring.aspx, retrieved from internet Sep. 5, 2019, 1 page.

Singh et al., Abstract Only "Real-time automated street utility pole components fault detection system using GSM communication," *3rd International Conference on Electrical, Electronics, Engineering Trends, Communication, Optimization and Sciences (EEECOS 2016)*, Jun. 1-2, 2016, 2 pages.

* cited by examiner

SUPPORT STRUCTURE INSPECTION DEVICES, SYSTEMS AND METHODS

PRIORITY CLAIM

The present application claims the benefit of priority of U.S. Provisional Application Ser. No. 62/727,021, filed Sep. 5, 2018, titled "Utility Pole Inspection Devices, Systems and Methods," which is incorporated herein by reference. The present application claims the benefit of priority of U.S. Provisional Application Ser. No. 62/735,370, filed Sep. 24, 2018, titled "Utility Pole Inspection Devices, Systems and Methods," which is incorporated herein by reference. The present application claims the benefit of priority of U.S. Provisional Application Ser. No. 62/864,065, filed Jun. 20, 2019, titled "Support Structure Inspection Devices, Systems and Methods," which is incorporated herein by reference.

FIELD

The present disclosure relates generally to support structure inspection, such as utility pole inspection.

BACKGROUND

Support structures such as utility poles can be used to support conductors for the distribution of electrical power in a utility distribution system. Utility poles can be made, for instance, from materials such as wood, concrete, steel or other materials. Utility poles can be subject to degradation over time due to exposure to weather and other environmental factors. In addition, utility poles can be damaged due to sudden collisions with the utility pole, high wind forces, natural disasters (e.g., earthquakes, tornados, hurricanes), as well as other factors. In that regard, utility poles need to be periodically inspected for integrity. In addition, maintenance actions and/or replacement needs to be performed periodically to maintain integrity of the utility poles.

SUMMARY

Aspects and advantages of embodiments of the present disclosure will be set forth in part in the following description, or may be learned from the description, or may be learned through practice of the embodiments.

One example aspect of the present disclosure is directed to a sensing system for support structure inspection. The system can include one or more sensors configured to obtain data associated with a condition of a support structure. The system can include one or more processors. The system can include a communication circuit operable to communicate a data packet to a remote device. The data packet can include a payload generated based at least in part on the data associated with the condition of the support structure. The system can include a power source operable to provide electrical power to the one or more sensors, one or more processors, and the communication circuit.

Other examples aspects of the present disclosure are directed to apparatus, electronic devices, non-transitory computer-readable media, methods, and processes for support structure inspection.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
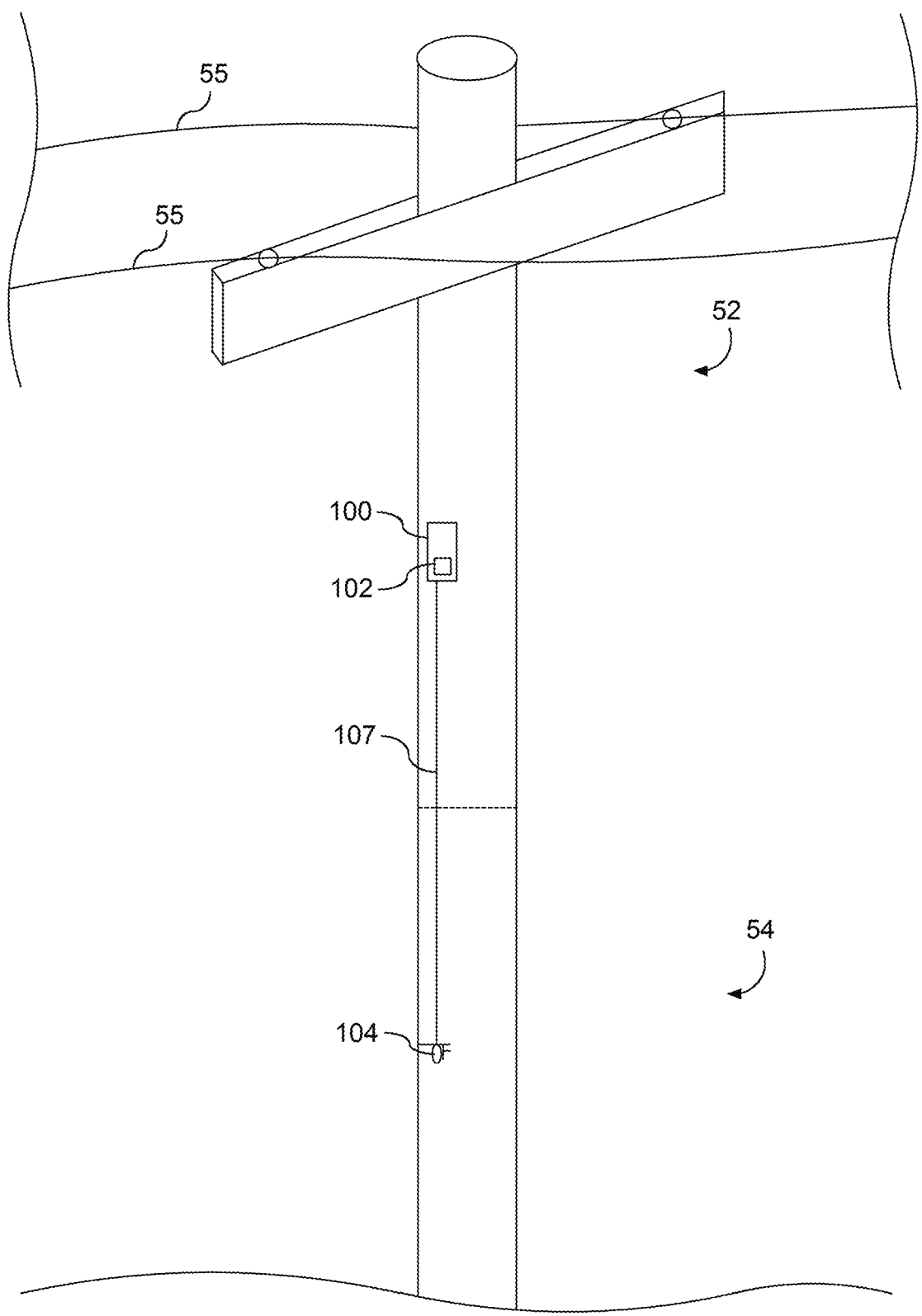
FIG. 1 depicts a utility pole having a sensing system according to example aspects of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to devices, systems and methods for sensing conditions and/or inspection of a support structure. Support structures such as utility poles can be routinely inspected for damage and decay by dispatching personnel to individual utility pole locations to assess pole condition and perform diagnostic evaluations. For instance, a visual inspection can be conducted for signs of anomalies in the support structure (e.g., pole lean, pole cracking, holes in the utility pole, presence of fungi, etc.). In some instances, an inspection test can be conducted by rapping a hammer on the wooden pole and listening for audio response. In some instances, a horizontal force can be applied to the pole to attempt to rock it back and forth. In some instances, excavation and inspection of the ground surface below the pole can be conducted to determine the presence of rot and/or decay. In some instances, boring can be conducted on the utility pole to check for decay. These inspection methods can be costly to implement and can be affected by human subjectivity.

According to example aspects of the present disclosure, support structure inspection devices can include one or more sensors installed at a support structure that monitor various conditions associated with the utility pole. Data associated with the condition of the support structure (e.g., utility pole) can be communicated back to the utility or other entity. Data from the sensors can be processed (e.g., by one or more processors located at the support structure sensing device on the support structure and/or by one or more remote devices, such as servers) to automatically assess the condition of the support structure. The data can be processed, for instance, to notify the utility or other entity that the support structure is experiencing unexpected behavior. In some embodiments, the data can be processed to notify the utility that the support structure has been damaged (e.g., knocked over) by a sudden impact, by wind, or by other event to allow the utility quicker response to developing situations.

Example aspects of the present disclosure are discussed with reference to a utility pole (e.g., wooden utility pole) for purposes of illustration and discussion. Those of ordinary skill in the art, using the disclosures provided herein, will understand that aspects of the present disclosure can be used to inspect other wooden support structures, such as poles to support lighting fixtures, bridge support structure, and other wooden support structures.

According to example embodiments of the present disclosure, a utility pole inspection device can be mounted to a utility pole. The utility pole inspection device can include one or more pole movement sensors that are configured to obtain data indicative of the condition of the utility pole. The one or more pole movement sensors can include sensors configured to obtain data indicative of movement of the utility pole and can include sensors such as accelerometers, gyroscopes, etc. Real-time and historical data obtained from the pole movement sensors can be processed and/or compared to data associated with other utility poles (e.g., nearby utility poles) to identify out of ordinary conditions that may require attention. For instance, the data from the pole movement sensors can be processed to identify strong vibrations, excessive movement, twisting, sinking, rocking, resting tilt, etc.

In some embodiments, the one or more pole movement sensors can gather pole movement data associated with a top portion of the utility pole, such as a portion of the utility pole at a height that is at least 50% of the total height of the utility pole, such as at least 75% of the total height of the utility pole, such as at least 85% of the total height of the utility pole. The dynamics of pole movement can be greater at a top portion of the utility pole. In that regard, locating the one or more pole movement sensors at a top portion of the utility pole can lead to improved sensitivity of the pole movement sensors.

In some embodiments, the utility pole inspection device can include an integrity sensor, such as a moisture sensor. The moisture sensor can be configured to obtain data indicative of the moisture content of the utility pole. In some embodiments, the moisture sensor can be a probe sensor that bores at least partially into the utility pole. In some embodiments, the moisture sensor can be an aluminum oxide moisture sensor. The data obtained by the moisture sensor can be indicative of the moisture content of the utility pole relative to, for instance, outdoor relative humidity. Real-time and historical data obtained from the moisture sensor can be processed and/or compared to data associated with other utility poles (e.g., nearby utility poles) to identify out of ordinary conditions that may require attention. For instance, the data from the pole movement sensors can be processed to identify conditions indicative of swelling, rotting, decay of the utility pole (e.g., as a result of high moisture content) or other conditions.

In some embodiments, the moisture sensor can obtain data associated with a bottom portion of the utility pole, such as a portion of the utility pole at a height that is less than 50% of the total height of the utility pole, such as less than 75% of the total height of the utility pole, such as less than 85% of the total height of the utility pole. As one example, a sensing system can include a pole movement sensor at a top portion of the utility pole and a moisture sensor at a bottom portion of the utility pole. Data from the pole movement sensor indicative of excessive movement in combination with data from the moisture sensor indicative of high moisture content can be indicative of an irregular condition or event occurrence associated with the utility pole.

In some embodiments, the integrity sensor can be an impedance based sensor. The impedance based sensor can obtain data indicative of an electrical impedance of the utility pole by passing a test signal through the utility pole. The impedance of the utility pole can be correlated to an integrity of the utility pole (e.g., condition of the wood). In some embodiments, the impedance based sensor can be configured to apply a test signal to the utility pole at a plurality of different frequencies (e.g., using a frequency sweep). The impedance based sensor can determine an impedance of the utility pole at each of the plurality of different frequencies to obtain an impedance profile. The impedance profile can provide an impedance of the utility pole at each of the plurality of different frequencies. The integrity or other measure of the condition of the utility pole can be determined based at least in part on the impedance profile (e.g., using a lookup table correlating wood condition to impedance at different frequencies).

In some embodiments, the impedance based sensor can obtain data associated with a bottom portion of the utility pole, such as a portion of the utility pole at a height that is less than 50% of the total height of the utility pole, such as less than 75% of the total height of the utility pole, such as less than 85% of the total height of the utility pole. As one example, a sensing system can include a pole movement sensor at a top portion of the utility pole and an impedance based sensor at a bottom portion of the utility pole. Data from the pole movement sensor indicative of excessive movement in combination with data from the impedance sensor indicative of condition of the utility pole can be indicative of an irregular condition or event occurrence associated with the utility pole.

In some embodiments, the utility pole inspection device can include other sensors, such as one or more environmental sensors configured to obtain data indicative of environmental conditions at the utility pole. The one or more environmental sensors can include, for instance, a microphone to detect audio events, such as sound associated with a collision and/or falling of the utility pole. The one or more environmental sensors can include, for instance, a temperature and/or barometric pressure sensor. The one or more environmental sensors can include, for instance, one or more wind sensors, strain gauges, lighting detectors, motion detectors, magnetometers, etc. The one or more environmental sensors can include, for instance, one or more UV sensors, air quality sensors, motion sensors (e.g., to detect presence of individuals or other objects/entities near the utility poles.

The data obtained by the environmental sensor(s) can be communicated to, for instance, the utility or other entity in conjunction with the data obtained by the, for instance, pole movement sensor(s) and/or moisture sensor(s). The data can be processed to determine the presence of an irregular condition or event occurrence associated with the utility pole.

The utility pole inspection systems according to example aspects of the present disclosure can include one or more processors. In some embodiments, the one or more processors can be configured to locally process the data obtained by the sensor(s) to identify an event occurrence. An event occurrence can be any event associated with a change of condition of the utility pole. For instance, an event occurrence can be associated with excessive tilting of the utility pole, excessive sinking of the utility pole, rot and/or decay of the utility pole, the utility pole falling down, twisting of the utility pole, excessive vibration of the utility pole or other change in condition of the utility pole. In some embodiments, the data obtained by the sensor(s) can be communicated to a remote device (e.g., a server) for remote processing by one or more processors to identify an event occurrence.

In some embodiments, the data obtained by the sensor(s) can be processed with respect to threshold crossings to identify significant changes to pole condition. For instance, an impact or collision with the utility pole can be identified when pole movement data (e.g., data indicative of vibration, data indicative of tilt, data indicative of high acceleration) exceeds a threshold. As another example, potential rot and/or decay associated with the utility pole can be identified when data obtained by the moisture sensor(s) is indicative of high moisture content for an extended period of time.

In some embodiments, the data obtained by the sensor(s) can be processed with respect to historical data (e.g., a historical baseline) to identify changes over time. Historically monitoring pole movement and/or moisture can allow for identification of slowly developing conditions (e.g., rot and/or decay) which can affect pole movement dynamics over time.

In some embodiments, the data obtained by the sensor(s) can be processed with respect to data associated with other utility poles (e.g., nearby utility poles). For instance, pole movement data and/or moisture data can be compared to pole movement data and/or moisture data for nearby poles to identify environmental effects for a group of utility poles. As another example, pole movement data and/or moisture data can be processed identify event occurrences with respect to the utility pole when the data deviates from data associated other utility poles.

The utility pole inspections devices according to example aspects of the present disclosure can include a communication circuit. The communication circuit can be operable to communicate data packets to remote devices. The data packets can include a payload that is generated based at least in part on the data associated with the condition of the utility pole obtained by the sensor(s). For instance, the payload can include the actual data obtained by the sensor(s). In embodiments where local processing is performed by one or more processors at the utility pole inspection apparatus mounted to the utility pole, the payload can include the results of the processing and/or data associated with a notification of an event occurrence.

The communication circuit can be operable to communicate the data packets using a variety of protocols over different communication media, such as wired and/or wireless communication media. In some embodiments, the communication circuit can be operable to communicate the data packets using a low power wide area network (LPWAN) protocol, such as Sigfox, Lora, Ingenu. In some embodiments, the protocol can be 802.11ah (HaLow). LPWAN can provide increased range of communication. HaLow can provide lower energy requirements and higher data rates. Other protocols can be used without deviating from the scope of the present disclosure. Example protocols include LoRaWAN, WiFi-ah (802.11ah), 3G, 4G, LTE, 5G, Sigfox, Ingenu, Digimesh, Synergize RF, or TWAC PLC.

In some embodiments, the communication circuit can be operable to communicate the data packets over a network. The network can include any combination of devices and wired and/or wireless communication links. In some embodiments, the network is a mesh network including a plurality of utility pole sensing devices or other devices suspended from and/or proximate to a utility pole. In some embodiments, the network can include or can be a part of an advanced metering infrastructure (AMI) network. In some embodiments, the network can be a cellular network.

The utility pole sensing devices according to example aspects of the present disclosure can include a power source configured to provide power to the one or more sensors, one or more processors, and/or the communication circuit. In some embodiments, the power source can include an energy storage device, such as a battery and/or a capacitor. In some embodiments, the power source can include a power harvesting system that is configured to charge and/or store energy in the energy storage device for powering the utility pole sensing devices. The power harvesting system can be configured to harness for instance, one or more of solar energy, wind energy, piezoelectric energy, electromagnetic energy associated with power lines suspended by the utility pole, or radio frequency energy. In some embodiments, a power harvesting circuit operable to harness wind energy can be used as a sensor to detect wind speed as an environmental condition associated with a utility pole.

In some embodiments, one or more control actions can be automatically implemented based at least in part on the data obtained by the utility pole sensing devices according to example embodiments of the present disclosure. The control actions can include sending a notification to dispatch a technical or other individual to the utility pole, discontinuing the distribution of power over conductors supported by the utility pole, contacting local services (e.g., police services, fire services) to take safety measures with respect to the utility pole, or other control actions.

Power line events may be detected by sensing partial discharge, which is a low leakage current from a primary through a path of least resistance to ground. Early detection of low leakage current may be used to correct and prevent power line events before they occur. Thus, in some embodiments, the system can include or can be coupled to as a power line sensor including a housing and a near field sensor. The housing is configured to couple to a power line. The near field sensor is configured to sense a leakage current on the power line. In some embodiments, the near field sensor may be, or includes, a current transformer (CT).

In some embodiments, the system can be used for determining a potential event on a power line. The system includes a first line sensor, a second line sensor, and a processor(s). The first line sensor includes a first near field sensor configured to sense a first leakage current at a first location on the line. The second line sensor includes a second near field sensor configured to sense a second leakage current at a second location on the line. The processor(s) is configured to receive data corresponding to the first leakage current and the second leakage current, and determine a location of a potential event on the line based on the data.

The systems and methods according to example aspects of the present disclosure provide a number of technical effects and benefits. For instance, the utility pole sensing devices can automatically notify a utility or other entity when a utility pole exhibits unexpected behavior to allow for inspection upon such notification. This can reduce inspection costs and reduce human error. As another example, the utility pole sensing devices can automatically notify a utility or other entity quickly when a utility pole is damaged (e.g., by impact) to allow faster utility response.

FIG. 1 depicts an example utility pole 50 supporting conductors 55 used to distribute electrical power, for instance, in a utility electrical power distribution system (e.g., utility grid). The utility pole 50 can be made from a variety of different materials. In some embodiments, the utility pole 50 includes a wood material. In some embodiments, the utility pole 50 includes a concrete material, composite material, or other material.

The utility pole 50 can include a top portion 52. The top portion 52 can be associated with a height that is greater than 50% of a total height of the utility pole. For instance, in some embodiments, the top portion 52 can be associated with a height that is greater than about 75% of the total height of the utility pole, such as greater than about 85% of the total height of the utility pole.

The utility pole 50 can include a bottom portion 54. The bottom portion 54 can be associated with a height that is less than 50% of a total height of the utility pole. For instance, in some embodiments, the bottom portion 54 can be associated with a height that is less than about 75% of the total height of the utility pole, such as less than about 85% of the total height of the utility pole.

A utility pole sensing device 100 is mounted to the utility pole 50. As will be discussed in more detail below, the utility pole sensing device 100 can include one or more sensors configured to obtain data associated with one or more conditions of the utility pole. The data can be communicated to one or more remote devices (e.g., associated with a utility). In this way, the utility pole sensing device 100 can automatically provide information associated with condition of the utility pole 50, reducing the need for periodic manual inspection.

Figure 2:
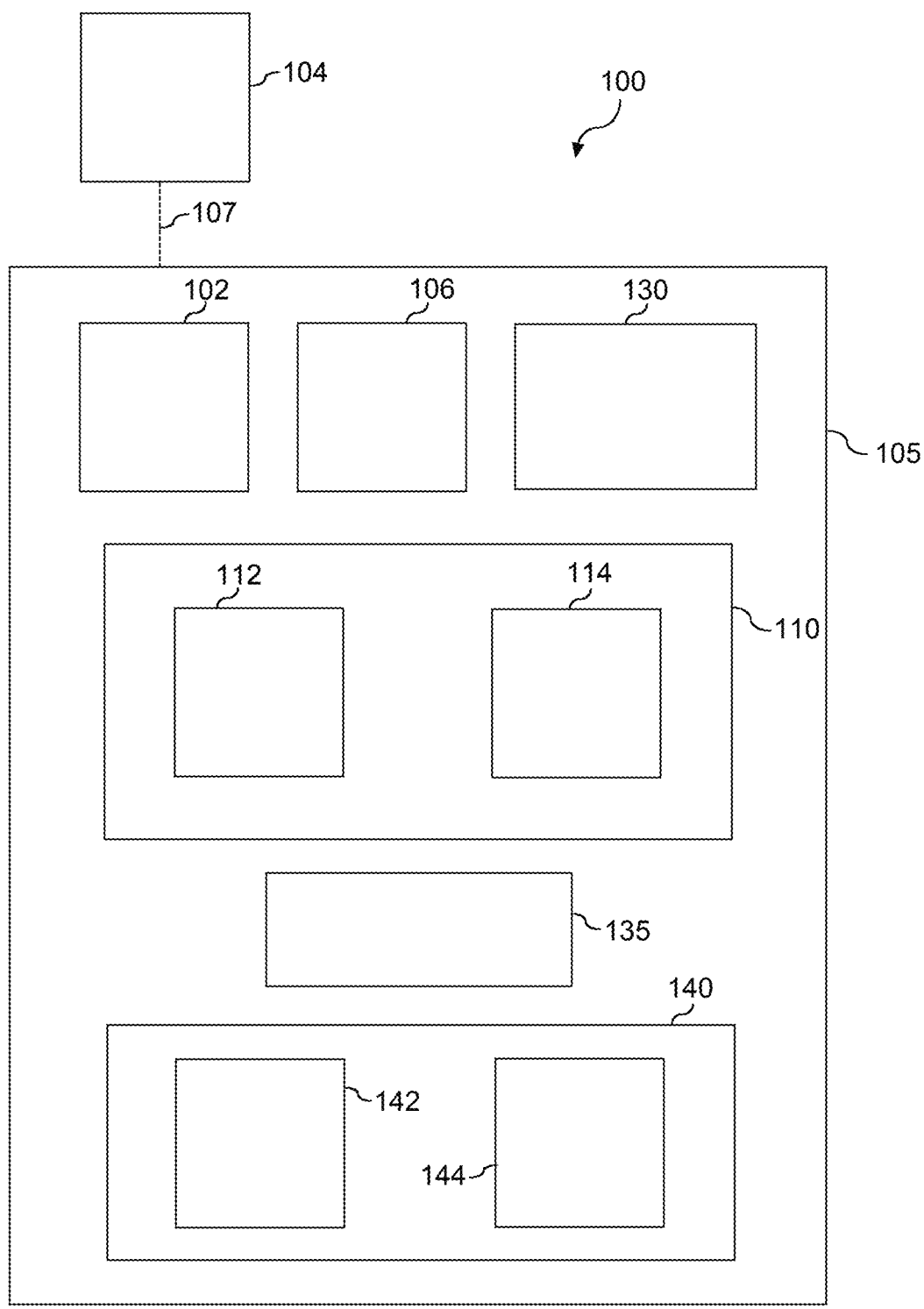
FIG. 2 depicts a block diagram of an example sensing system according to example aspects of the present disclosure.

FIG. 2 depicts an example utility pole sensing device 100 according to example aspects of the present disclosure. The utility pole sensing device 100 can include a housing 105 configured to house various components of the utility pole sensing device 100. The housing 105 can have a form factor suitable for mounting to a utility pole 50. Mounting bracket(s) or other securement can be used to secure the sensing device 100 to the utility pole 50. As shown in FIG. 1, the housing 105 can be secured to a top portion 52 of the utility pole 50.

The utility pole sensing device 100 can include one or more pole movement sensors 102. The pole movement sensor(s) 102 can be configured to obtain data indicative of movement of the utility pole 50. For instance, the pole movement sensor(s) 102 can obtain acceleration data, orientation data, tilt data, vibration data, or other data associated with movement and/or positioning of the utility pole 50. In some embodiments, the pole movement sensor(s) 102 can include one or more of an accelerometer, gyroscope, vibration sensor (e.g. piezoelectric vibration sensor), or other suitable sensor. The pole movement sensors 102 can be internal to housing 105. In some embodiments (not illustrated), the pole movement sensors 102 can be external to housing 105 and can communicate data to components within housing 105 of the utility pole sensing device 100 via a wired and/or wireless interface.

The utility pole sensing device 100 can include one or more integrity sensors 104. The integrity sensor can be a moisture sensor(s). The moisture sensor(s) can be configured to obtain data indicative of moisture content of the utility pole. In some embodiments, the moisture sensor(s) can be a probe sensor configured to at least partially bore into the utility pole. The moisture sensor(s) 104 can be, for instance, an aluminum oxide moisture sensor. Other suitable moisture sensor(s) can be used without deviating from the scope of the present disclosure.

In some embodiments, the integrity sensor(s) 104 can include an impedance based sensor(s) configured to measure the condition of wood. The impedance based sensor can obtain data indicative of an electrical impedance of the utility pole by passing a test signal through the utility pole. The impedance of the utility pole can be correlated to a particular integrity of the utility pole (e.g., condition of the wood). In some embodiments, the impedance based sensor can be configured to apply a test signal to the utility pole at a plurality of different frequencies (e.g., using a frequency sweep). The impedance based sensor can determine an impedance of the utility pole at each of the plurality of different frequencies to obtain an impedance profile. The impedance profile can provide an impedance of the utility pole at each of the plurality of different frequencies. The integrity or other measure of the condition of the utility pole can be determined based at least in part on the impedance profile (e.g., using a lookup table correlating wood condition to impedance at different frequencies).

As shown in FIG. 2, in some embodiments, the integrity sensor(s) 104 can be located external to the housing 105. The integrity sensor(s) 104 can communicate data to components within housing 105 of the utility pole sensing device 100 via a wired and/or wireless interface. This can allow the integrity sensor(s) 104 to obtain data indicative of moisture content of the utility pole 50 at a different location relative to the movement sensor(s) 102 or other sensors.

For example, referring to FIG. 1, a utility pole sensing device 100 can be mounted to a top portion 52 of the utility pole 50. The movement sensor(s) 102 can be located within a housing 105 associated with the utility pole sensing device 100 mounted to the top portion 52 of the utility pole 50. Due to increase motion dynamics of the top portion of the utility pole 50, this can increase sensitivity of the movement sensor(s) 102 in detecting conditions associated with the utility pole 50.

The integrity sensor(s) 104 can be located at a bottom portion of the utility pole 50. The integrity sensor(s) 104 can communicate data obtained by the integrity sensor(s) 104 to components within the housing of the utility pole sensing device 100 via an interface 107. The interface 107 can be a conductor traveling along the utility pole 50. However, other suitable wired and/or wireless interfaces (e.g., Bluetooth) can be used without deviating from the scope of the present disclosure.

The arrangement of sensor(s) 102 and 104 in FIG. 1 is provided for purposes of illustration of one example embodiment of the present disclosure. Other suitable arrangements can be used. For instance, the integrity sensor 104 an be included within housing 105 or can protrude from the back of housing 105 into the utility pole 50.

Referring to FIG. 2, the utility pole sensing device 100 can include one or more environmental sensors 106. The environmental sensor(s) 106 can be configured to obtain data associated with conditions proximate to the utility pole. Example environmental sensor(s) 106 can include a microphone configured to obtain audio data. The audio data can be processed, for instance, to identify sounds associated with an event occurrence, such as an impact with the utility pole or falling of the utility pole. The audio data can be processed to identify other conditions, such as corona discharge, arc detection (from electrical equipment events), RF noise, etc.).

Example environmental sensor(s) 106 can include sensor(s) associated with the weather, such as temperature sensors, barometric pressure sensors, rain gauges, lighting detection sensors, etc. Data obtained by the weather sensors can be correlated with event occurrences to determine a cause of the event occurrence. Data obtained by the weather sensors can be communicated to remote devices for general use (e.g., by weather forecasters).

In some embodiments, environmental sensor(s) 106 can include motion sensor(s). Motion sensor(s) can be used to obtain data indicative of movement of objects near the utility pole 50. The data indicative of movement of objects near the utility pole can be processed to assist with determination of an event occurrence. For instance, sudden motion near a utility pole can be indicative of an impact with the utility pole. Data indicative of movement of objects near the utility pole during an event occurrence can also be used to determine control actions for responding to the event occurrence. For instance, a utility can automatically terminate distribution of electrical power over conductors supported by the utility pole during an event occurrence with the data indicative of motion of objects indicates high activity near the utility pole.

Other sensors and/or data acquisition devices can be included as part of the utility pole sensing device 100. For instance, the utility pole sensing device 100 can include a strain gauge configured to measure stress or strain or different parts of the utility pole. In some embodiments, the one or more environmental sensors can include, for instance, one or more UV sensors, air quality sensors and other sensors.

In some embodiments, the utility pole sensing device 100 can include an image capture device, such as a camera. The camera can acquire one or more images or video continuously and/or during an event occurrence. The images/video can be communicated to remote devices for processing (e.g., streaming in near real time) to observe conditions.

In some embodiments, digital image processing techniques can be implemented on the images acquired by the camera to identify a change in the images over time (e.g., using feature matching techniques). A change in the images can be used to identify an event occurrence associated with the utility pole.

In some embodiments, the image capture device can be used for surveillance, vehicle and/or pedestrian counting, traffic monitoring, parking spot monitoring, and other conditions. In some embodiments, the image capture device can include an infrared image capture device.

The sensors associated with the utility pole sensing device 100 can be used to detect various conditions. For instance, the pole movement sensors 102 can detect pole movement and/or tilt conditions. Environmental sensors 106, such as motion sensor and microphone can be used to detect sounds and/or motion associated with electrical equipment failure and/or human presence. Signals from the motion sensor and/or microphone can be used to detect events, such as gun shots or other ballistics. Signals from a microphone and/or UV sensor can be used to detect corona discharge. Signals from a magnetometer can be used to detect, for instance, a geomagnetic storm (e.g., solar flare). Signals from an air quality sensor can be used to detect pollution. Signals from an air quality sensor, UV sensor, humidity sensor, temperature sensor, wind speed sensor (anemometer), barometer, or light sensor can be used to detect various weather conditions. In some embodiments, signals from one or more of the sensors can be processed to identify conditions associated with nearby electrical equipment (e.g., equipment mounted to the utility pole).

Referring to FIG. 2, the utility pole sensing device 100 can include one or more control devices 110. The control devices 110 can control operation of the various components of the utility pole sensing device 100 (e.g., sensors 102, 104, 106, communication circuit 130, clock 135, power source 140, etc.) to provide any of the desired functionality described herein and/or other functionality.

In some embodiments, the control device(s) 110 can include one or more processors 112 and one or more memory devices 114. The one or more processors 112 can include, for instance, microcontrollers, microprocessors, logic circuits, application specific integrated circuits, etc. The one or more memory devices 114 can include, for instance, non-transitory computer-readable storage media, such as RAM, ROM, EEPROM, EPROM, flash memory devices, other suitable memory devices, etc. and/or combinations thereof.

The one or more memory devices 114 can store computer-readable instructions that when executed by the one or more processors 112 cause the one or more processors to provide functionality according to example aspects of the present disclosure. For instance, the one or more memory devices 114 can store computer-readable instructions that when executed by the one or more processors 112 cause the one or more processors 112 to implement any of the data processing techniques and/or communication techniques disclosed herein.

In some embodiments, the utility pole sensing device 100 can include a clock 135, such as a real-time clock. The clock 135 can be used, for instance, to associate time stamp data with the data obtained by the various sensors associated with the utility pole sensing device 100. The time stamp data can be used, for instance, to perform historical processing, identify trends, identify times associated with event occurrences, for comparison to other utility poles, and other purposes.

The clock 135 can be set during installation of the utility pole sensing device 100 on a utility pole. Various methods can be used to address clock drift (e.g., shifting of time provided by clock 135 relative to true time). For instance, the clock 135 can periodically sync with time data from remote devices when sending and/or receiving communications. In some embodiments, data obtain from the one or more sensors and/or image capture devices can be processed to sync the time provided by the clock 135 with a true time. For instance, based on data accessed via a communication link (e.g., weather date), the one or more processors 112 can determine that sunset occurs at a particular time of day. The one or more processors 112 can conduct image processing on images captured by the image capture device to determine if sunset is occurring at that time of day based on the time from clock 135. If time from clock 135 when the sunset image is captured deviates from the true time of sunset, the one or more processors 112 can adjust the clock 135 to be closer to true time.

The utility pole sensing device 100 can include a power source 140. The power source 140 can be configured to power components of the utility pole sensing device 100, such as sensors 102, 104, 106, control device 110, clock 135, communication circuit 130, and other components. In some embodiments, the power source 140 can include an energy storage device 142. The energy storage device 142 can be a battery and/or a capacitor. In some embodiments, the power source 140 can include a power harvesting system 144 that can be configured to charge the energy storage device 142 to extend the life of energy storage device 142. The power harvesting system 144 can be configured to harness for instance, one or more of solar energy, wind energy, piezoelectric energy, electromagnetic energy associated with power lines suspended by the utility pole, or radio frequency energy. In some embodiments, a power harvesting circuit operable to harness wind energy can be used as a sensor to detect wind speed as an environmental condition associated with a utility pole.

The utility pole sensing device 100 can include a communication circuit 130. The communication circuit 130 is operable to communicate data packets between the utility pole sensing device 100 and one or more remote devices. The communication circuit 130 can include, for instance, one or more circuits, modules, components, software, firmware, receivers, transceivers, encoders, decoders, antenna, front end modules, etc. for communicating data packets via a wired and/or wireless communication medium.

The communication circuit 130 can be configured to communicate over a wide variety of different technologies and/or protocols without deviating from the scope of the present disclosure. Example communication technologies and/or protocols can include LoRaWAN, WiFi-ah (802.11ah), 3G, 4G, LTE, 5G, Sigfox, Ingenu, Digimesh, Synergize RF, or TWAC PLC. Example communication technologies and/or protocols can include, for instance, Bluetooth low energy, Bluetooth mesh networking, near-field communication, Thread, TLS (Transport Layer Security), Wi-Fi (e.g., IEEE, 802.11), Wi-Fi Direct (for peer-to-peer communication), Z-Wave, Zigbee, HaLow, cellular communication, LTE, low-power wide area networking (Sigfox, Lora, Ingenu), VSAT, Ethernet, MoCA (Multimedia over Coax Alliance), PLC (Power-line communication), DLT (digital line transmission), etc. Other suitable communication technologies and/or protocols can be used without deviating from the scope of the present disclosure. LPWAN protocols can provide increased range of communication. HaLow can provide lower energy requirements and higher data rates. Other protocols can be used without deviating from the scope of the present disclosure.

The utility pole sensing device 100 can communicate data obtained by the one or more sensors 102, 104, and 106 to remote device(s) using the communication circuit 130. Similarly, the utility pole sensing device 100 can communicate data determined by the one or more processors 112 to remote device(s) using the communication circuit 130. The utility pole sensing device 100 can receive data (e.g., information, control commands, software updates, etc.) from remote device using the communication circuit 130.

Figure 3:
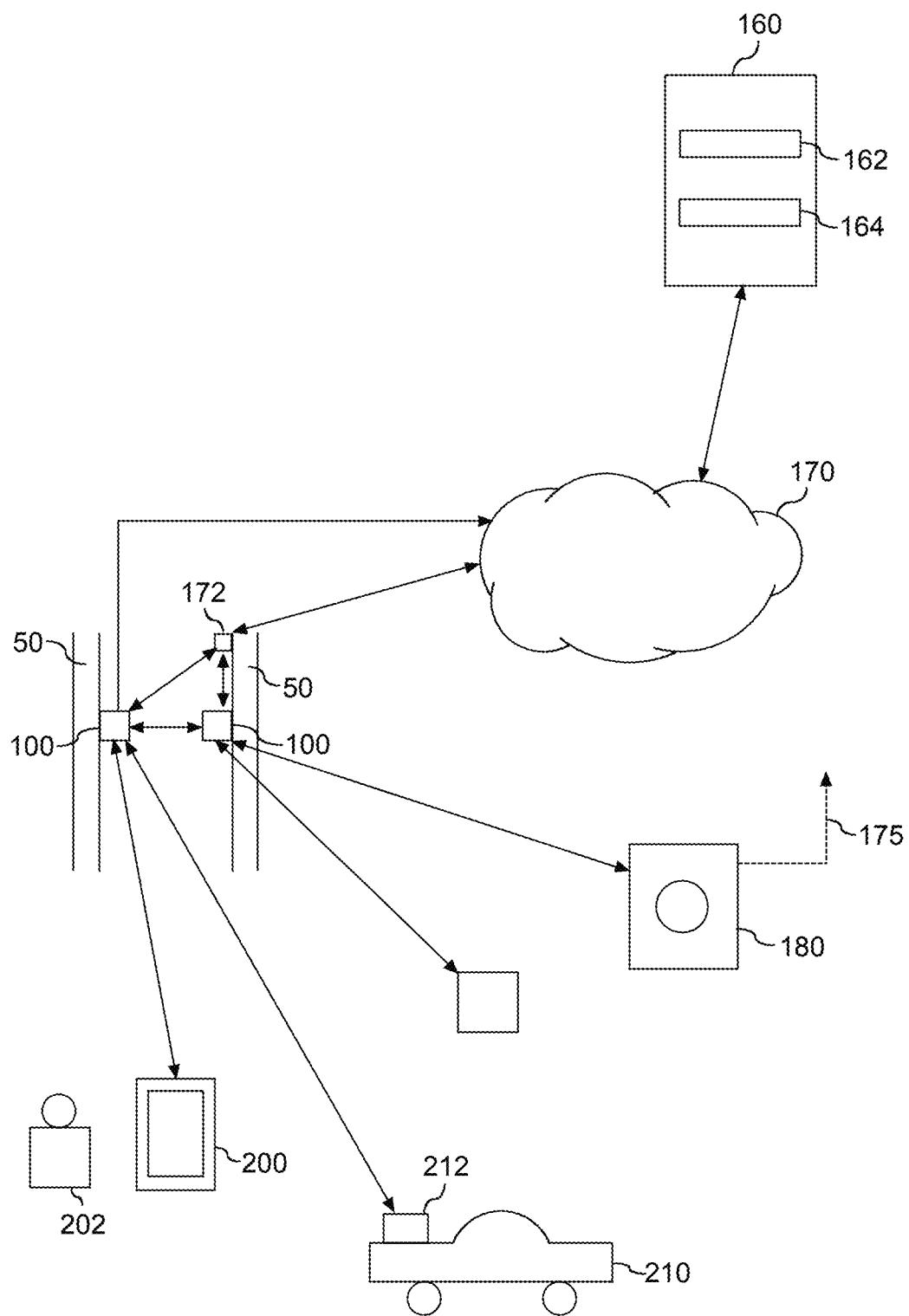
FIG. 3 depicts an example system according to example embodiments of the present disclosure.

FIG. 3 depicts one example communication environment for the utility pole sensing devices 100 according to example embodiments of the present disclosure. As shown, the utility pole sensing device(s) 100 can be in communication with various devices, such as other utility pole sensing device(s) 100, gateway 172, remote device 160 (e.g., server), utility meter 180, appliance 185, user device 200, or other device.

The utility pole sensing device(s) 100 can be in communication with the various devices using direct communication links and/or over one or more networks, such as network 170. Network 170 can be any suitable communication network or combination of networks.

For instance, in some embodiments, the network 170 can include a local area network and/or a wide area network. In some embodiments, the network(s) can include one or more of a secure network, Wi-Fi network, AMI network, mesh network, the Internet, cellular network, or other wide area network, one or more peer-to-peer communication links, and/or some combination thereof, and can include any number of wired or wireless links. Communication over the network 340 can be accomplished, for instance, via a communication interface using any type of protocol, protection scheme, encoding, format, packaging, etc.

As shown, in some examples, a first utility pole sensing device 100 can have a direct communication link with a second utility pole sensing device 100 located on a nearby utility pole. The second utility pole sensing device 100 can have a direct communication link to a gateway 172 and/or other with communication capability (e.g., smart utility meter 180, smart appliance 185, industrial controller 187) for accessing network 170.

As one specific non-limiting example, the smart utility meter 180 may have access to an AMI network over a communication link 175. The first utility pole sensing device 100 can have access to the AMI network by communicating with a direct link to second utility pole sensing device 100. Second utility pole sensing device 100 can communicate with smart utility meter 180. Smart utility meter 180 can communicate with the AMI network via link 175. In this way, the utility pole sensing devices 100 can be easily integrated with existing AMI networks.

As shown, the utility pole sensing devices 100 can communicate with a remote device 160 via network 170, which can be a server (e.g., a server associated with a utility control system). The remote device 160 can include one or more processors 162 and one or more memory devices 164. As will be discussed in more detail below, the remote devices 160 can process data provided from one or more utility pole sensing devices 100 to provide various notifications, alerts, monitoring status, reports, historical data, control actions, etc.

In some embodiments, the utility pole sensing device 100 can be configured to communicate with a user device 200 when a user 202 bring the user device 200 in proximity to the utility pole sensing device 100. In some embodiments, the user device 200 can be a special purpose device carried by a technician (e.g., utility reader, sensor reader, etc.). In some embodiments, the user device 200 can be a device capable of being carried by hand of user 200. The user device 200 can be, for instance, a laptop, smartphone, tablet, wearable device, display with one or more processors, or other device. In some embodiments, the user device 200 can include a display for presenting a graphical user interface to a user.

In some embodiments, the utility pole sensing device 100 can communicate data to the user device 200. The user device 200 can communicate data over one or more networks 170 to remote device 160 for reporting and/or processing.

In some embodiments, the utility pole sensing device 100 can be in communication with a computing device 212 carried by a vehicle 210. The computing device 212 can automatically periodically communicate with various utility pole sensing devices 100 to obtain data from the utility pole sensing device 100 as the vehicle drives proximate to the utility pole sensing device 100. The computing device 212 can communicate the obtained data over a network 170 to remote device 160 for reporting and/or processing.

In some embodiments, the remote device 160 can be associated with a cloud computing platform for implementation of one or more services for the utility pole sensing device 100. Data collected by the cloud computing platform can be processed and stored and provided, for instance, to a user device 200 or other device (e.g., for presentation in a graphical user interface).

As discussed above, the computing systems and devices discussed herein can include one or more processors and one or more memory devices. The computing systems and devices can be distributed such that its components are located in different geographic areas. The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

Referring to FIG. 2, the communication circuit 130 can be configured to continuously communicate data associated with a condition of the utility pole to remote devices or can periodically communicate data (e.g., as devices become proximate to the utility pole, at programmed intervals, upon detection of events/triggers, etc.). In some embodiments, the utility pole sensing device 100 can be configured to communicate data packets at periodic intervals at a first frequency. Upon the occurrence and/or detection of an event occurrence or other trigger, the utility pole sensing device 100 can be configured to communicate data packets at periodic intervals at a second frequency. The second frequency can be greater than the first frequency. In this way, the power requirements of the utility pole sensing device 100 can be reserved for other core functions during times of little activity. However, during a detected event occurrence or other condition, the utility pole sensing device 100 can more regularly communicate information so that a utility can keep apprised of developing situations.

In some embodiments, the communication circuit 130 can communicate data to remote device(s) via data packets. The data packets can include a payload. The payload can include, for instance, data obtained by one or more sensors and/or data generated by one or more processors (e.g., results of data processing, conditioned data, filtered data, etc.) of the utility pole sensing device 100.

Figure 4:
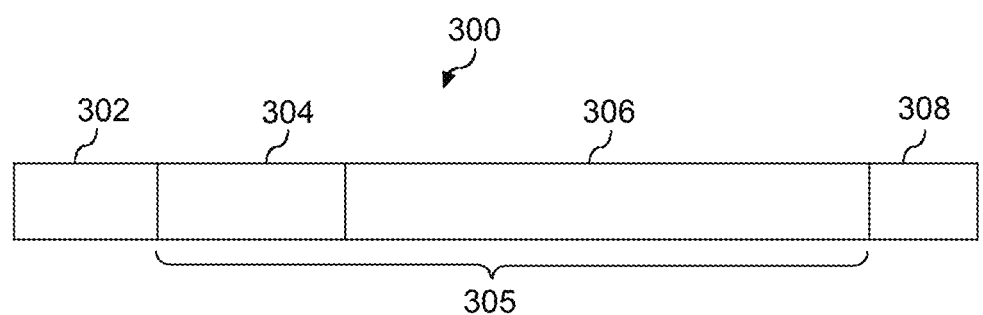
FIG. 4 depicts an example data packet communicated by a utility pole inspection device according to example embodiments of the present disclosure.

FIG. 4 depicts one example data packet 300 that can be communicated by a utility pole sensing device 100 according to example embodiments of the present disclosure. The data packet can include a header 302, a payload 305, and a verification portion 308. The payload 305 can include a utility pole identifier 304. The utility pole identifier 304 can include a serial number and/or other identifier associated with a particular utility pole. The utility pole identifier 304 can assist remote device in determining where a particular event occurrence is located (e.g., by coordinating the utility pole identifier with a location stored in a database). The payload 305 can include data 306 associated with a condition of the utility pole. As discussed above, the data 306 can include, for instance, data obtained by one or more sensors and/or data generated by one or more processors (e.g., results of data processing, conditioned data, filtered data, etc.) of the utility pole sensing device 100.

Figure 5:
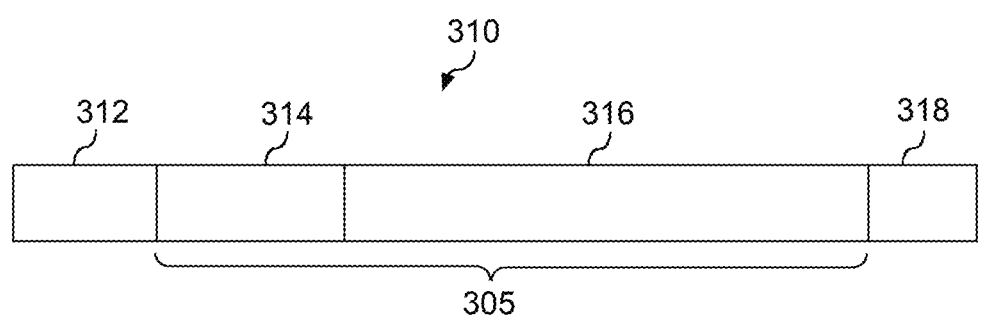
FIG. 5 depicts an example data packet communicated by a utility pole inspection device according to example embodiments of the present disclosure.

FIG. 5 depicts one example data packet 310 that can be communicated by a utility pole sensing device 100 according to example embodiments of the present disclosure. The data packet can include a header 312, a payload 315, and a verification portion 318. The payload 315 can include a location identifier 304 (e.g., geographic coordinates). The location identifier 304 can be determined using, for instance, a positioning system (e.g., GPS) when commissioning and/or installing the utility pole sensing device 100 on a utility pole. The payload 315 can include data 316 associated with a condition of the utility pole. As discussed above, the data 316 can include, for instance, data obtained by one or more sensors and/or data generated by one or more processors (e.g., results of data processing, conditioned data, filtered data, etc.) of the utility pole sensing device 100.

Various verification, authentication, and security protocols can be implemented in communications between a utility pole sensing device 100 and a remote device. For instance, in some embodiments, the data packets can be encrypted when communicated. In some embodiments, a verification routine can be implemented when a utility pole sensing device 100 communicates a report or notification of an event occurrence or other condition to a remote device. For example, upon receipt of data indicative of an event occurrence or other condition from a utility pole sensing device 100, a remote device can send a request to send sensor data or other data to verify the occurrence of the event condition. This can result in fewer reporting/notification of false positives at the remote device.

As discussed above, the data obtained by the sensor(s) on the utility pole sensing device can be processed using data processing techniques to identify the occurrence of one or more event occurrences or other conditions. The data processing techniques can be performed locally by one or more processors at the utility pole sensing device, at a remote device (e.g., a cloud server), or can be shared across multiple devices (e.g., a plurality of utility pole sensing devices, user devices, cloud servers, etc.).

Figure 6:
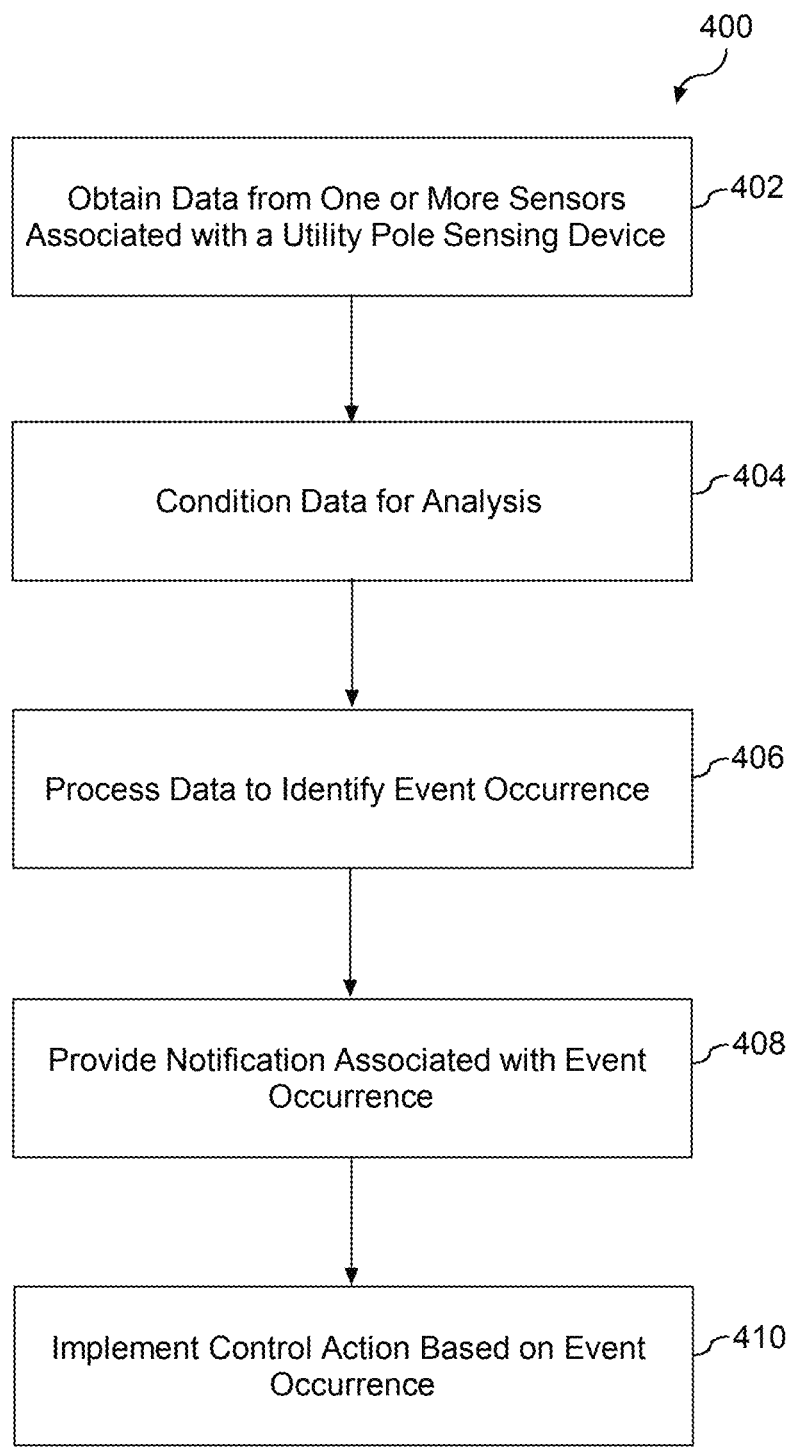
FIG. 6 depicts a flow diagram of an example method according to example embodiments of the present disclosure.

FIG. 6 depicts a flow diagram of one example method (400) for detecting a condition of a utility pole according to example embodiments of the present disclosure. The method (400) can be implemented by one or more processors, such as locally by one or more processors at the utility pole sensing device, at a remote device (e.g., a cloud server), or can be shared across multiple devices (e.g., a plurality of utility pole sensing devices, user devices, cloud servers, etc.). FIG. 6 depicts steps performed in a particular order for purposes of illustrations and discussion. Those of ordinary skill in the art, using the disclosures provided herein, will understand that various steps of any of the methods provided herein can be adapted, modified, rearranged, performed simultaneously, include steps not illustrated, or expanded in various ways without deviating from the scope of the present disclosure.

At (402), the method includes obtaining data from one or more sensors associated with a utility pole sensing device. In some embodiments, the data can include, for instance, data from sensors 102, 104, and/or 106 illustrated in FIG. 2. At (404), the method can include conditioning the data for processing. For example, the data can be filtered, smoothed, verified, authenticated, or other be subjected to other processing steps.

Figure 7:
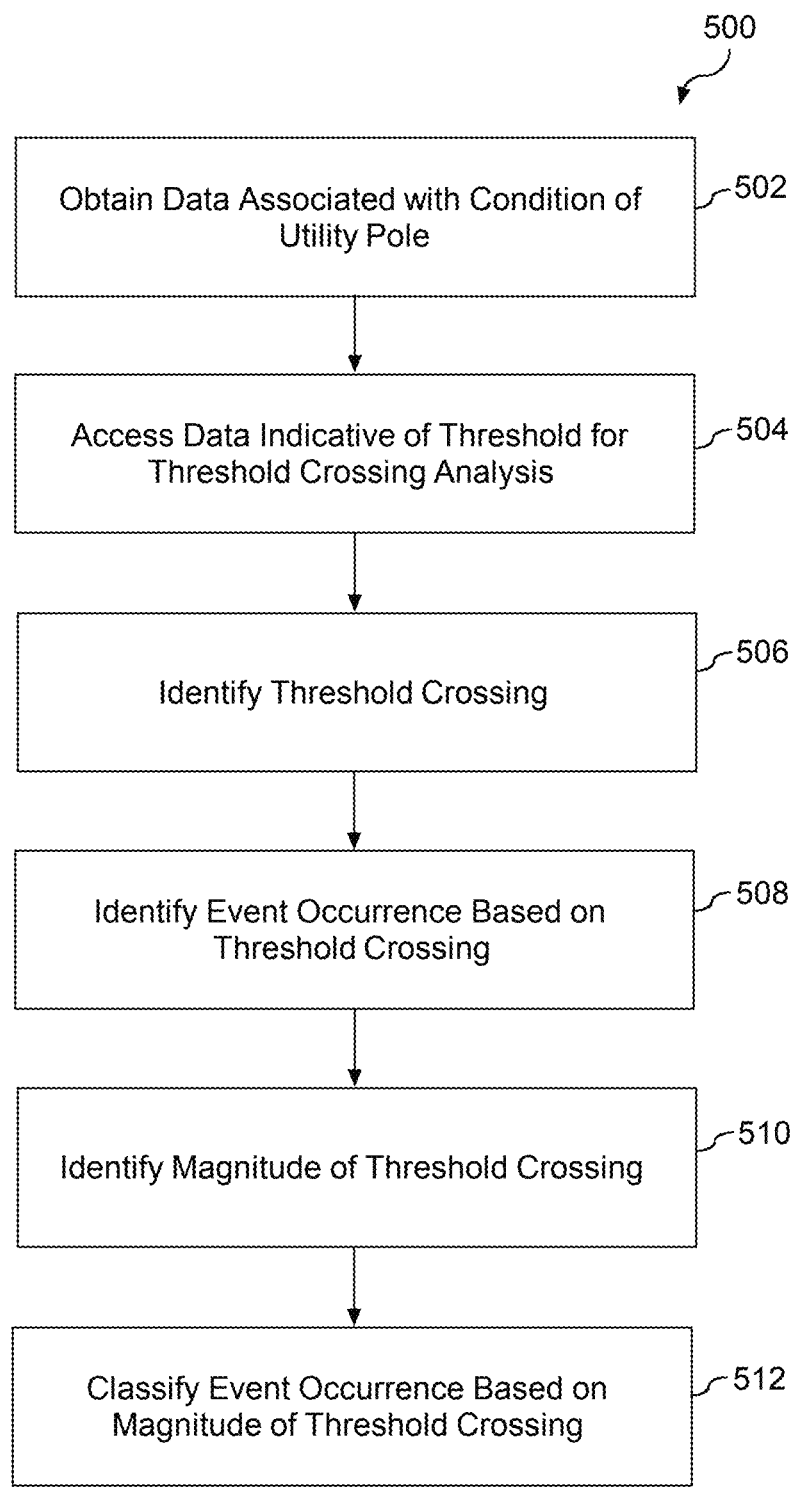
FIG. 7 depicts a flow diagram of an example method according to example embodiments of the present disclosure.
Figure 8:
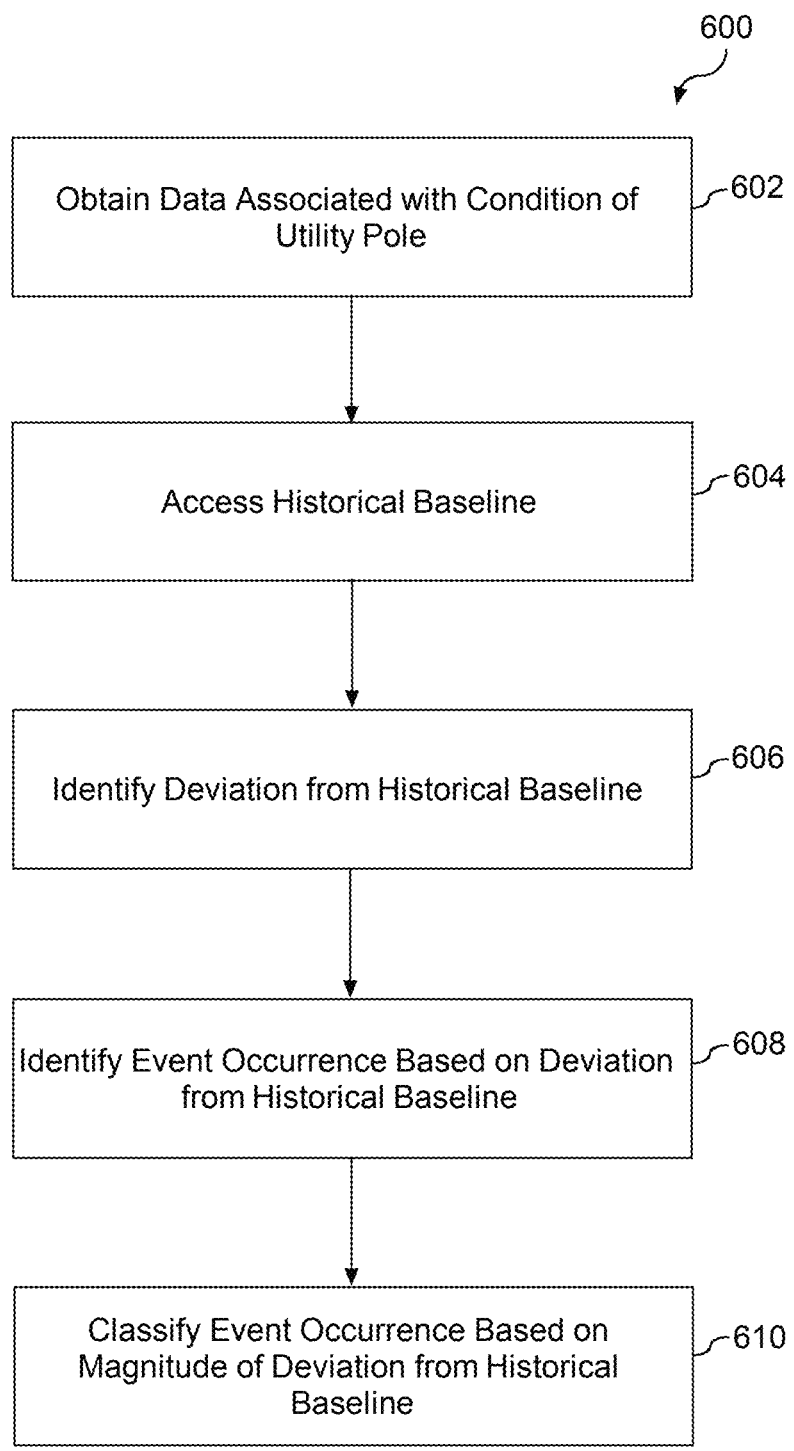
FIG. 8 depicts a flow diagram of an example method according to example embodiments of the present disclosure.
Figure 9:
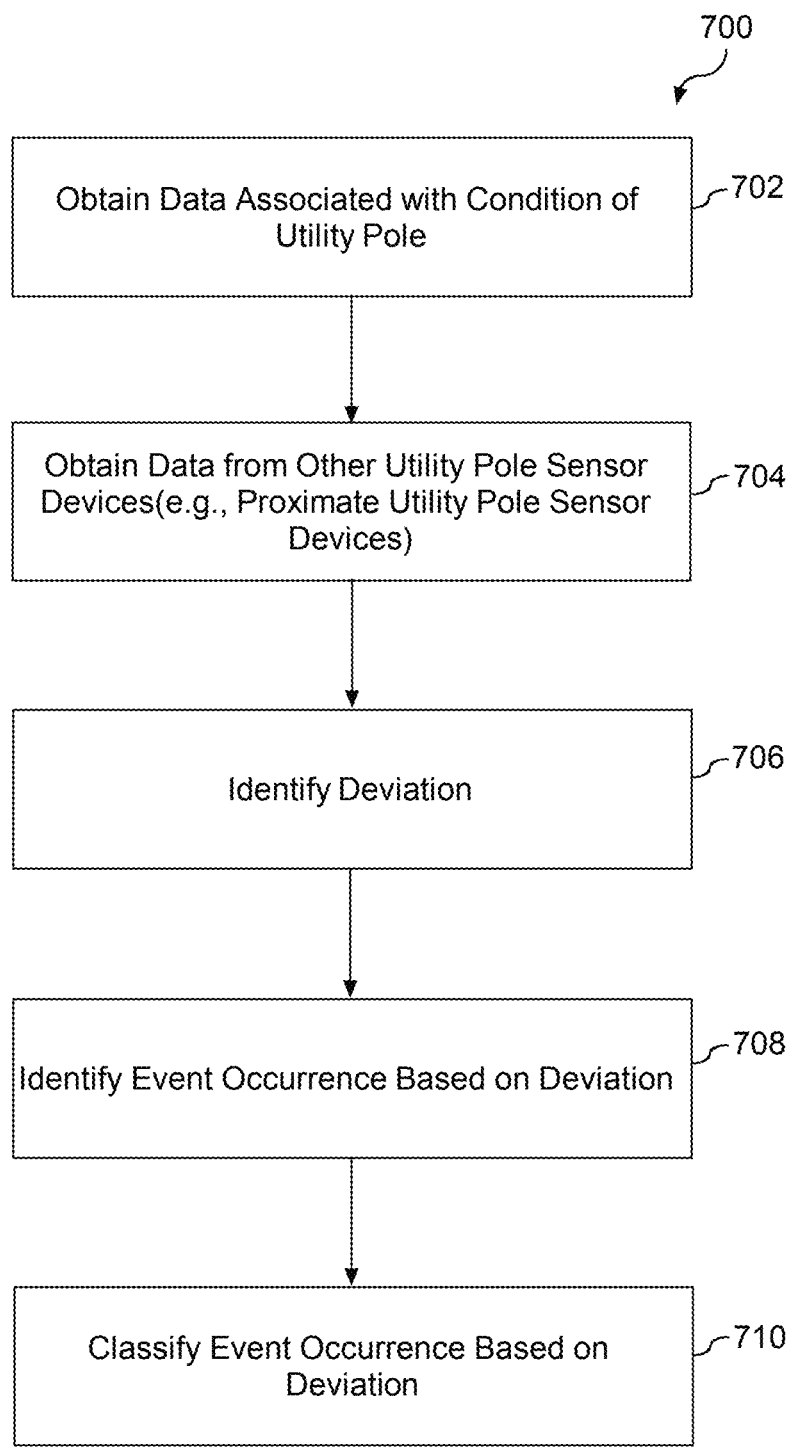
FIG. 9 depicts a flow diagram of an example method according to example embodiments of the present disclosure.

At (406), the method includes processing the data to identify an event occurrence. Example methods for processing the data to identify an event occurrence are illustrated in FIGS. 7-9. However, other suitable processing techniques can be used to identify an event occurrence or other condition associated a utility pole without deviating from the scope of the present disclosure.

At (408), the method includes providing a notification associated with the event occurrence. In some embodiments, the notification can be provided by a utility pole sensing device. For instance, an output device located on the utility pole sensing device can provide an audio, visual or other suitable indicator associated with the event occurrence.

In some embodiments, the notification can be provided by a remote device in communication with the utility pole sensing device. For instance, a notification can be presented in a graphical user interface presented on a display screen associated with the remote device (e.g., server, user device, etc.). The graphical user interface can present other information associated with data collected by one or more utility pole sensing devices, such as reports, comparisons, charts, analytics, etc.

At (410), the method includes implementing a control action based on the event occurrence. The control action can be an automatic response to the identification of an event occurrence associated with one or more utility poles. Example control actions can include, for instance: sending a notification to dispatch a technical or other individual to the utility pole, discontinuing the distribution of power over conductors supported by the utility pole, contacting local services (e.g., police services, fire services) to take safety measures with respect to the utility pole, or other control actions.

FIG. 7 depicts a flow diagram of one example method (500) for processing data collected by a utility pole sensing device to identify an event occurrence according to example embodiments of the present disclosure. The method (500) can be implemented by one or more processors, such as locally by one or more processors at the utility pole sensing device, at a remote device (e.g., a cloud server), or can be shared across multiple devices (e.g., a plurality of utility pole sensing devices, user devices, cloud servers, etc.). FIG. 7 depicts steps performed in a particular order for purposes of illustrations and discussion. Those of ordinary skill in the art, using the disclosures provided herein, will understand that various steps of any of the methods provided herein can be adapted, modified, rearranged, performed simultaneously, include steps not illustrated, or expanded in various ways without deviating from the scope of the present disclosure.

At (502), the method includes obtaining data from one or more sensors associated with a utility pole sensing device. In some embodiments, the data can include, for instance, data from sensors 102, 104, and/or 106 illustrated in FIG. 2.

At (504), the method includes accessing data indicative of threshold for a threshold crossing processing. The thresholds can be programmed thresholds. Each threshold can be indicative of an event occurrence. For instance, a tilt angle threshold can be programmed to identify excessive tilt of a utility pole. A moisture threshold can be programmed to identify excessive moisture (e.g., over a time period) for the utility pole. An acceleration threshold can be programmed to identify excessive acceleration of a utility pole. Other thresholds and/or combinations of thresholds can be used without deviating from the scope of the present disclosure.

The thresholds can be manually programmed or set by other methods. In some embodiments, the threshold can be identified based on processing of historical data collected by one or more utility pole sensing devices. In some embodiments, the threshold can be dynamically variable based on other conditions (e.g., time of year, age of the utility pole, surface on which the utility pole is mounted, other changing conditions). In some embodiments, threshold can be identified using machine learning techniques or other processing techniques.

At (506), the method can include identifying a threshold crossing. For instance, the method can identify when the data (e.g., accelerometer readings) crosses a threshold (e.g., acceleration threshold). In some embodiments, the threshold crossing can be identified when a threshold has been crossed for a period of time. For instance, the method can identify when moisture data is indicative of moisture exceeding a moisture threshold for a defined period of time.

At (508), the method can include identifying the event occurrence based at least in part on the threshold crossing. For instance, an event occurrence can be identified when there is a threshold crossing.

At (510), in some embodiments, the method can include determining a magnitude of the threshold crossing. The magnitude of the threshold crossing can be indicative of the amount that the data exceeds and/or falls below a threshold. At (512), the method can include classifying the event occurrence based on the magnitude of the threshold crossing. As an example, event occurrences can be assigned priority levels based on the magnitude of the threshold crossing. Threshold crossings with greater magnitude can be classified as higher priority event occurrences relative to threshold crossings with lesser magnitude.

Higher priority event occurrences can result in different control actions being implemented relative to lower priority event occurrences. As an example, a higher priority event occurrence can result distribution of power over the utility pole being discontinued until the event occurrence is resolved. Lower priority event occurrences can result in the scheduling of a manual inspection.

FIG. 8 depicts a flow diagram of one example method (600) for processing data collected by a utility pole sensing device to identify an event occurrence according to example embodiments of the present disclosure. The method (600) can be implemented by one or more processors, such as locally by one or more processors at the utility pole sensing device, at a remote device (e.g., a cloud server), or can be shared across multiple devices (e.g., a plurality of utility pole sensing devices, user devices, cloud servers, etc.). FIG. 8 depicts steps performed in a particular order for purposes of illustrations and discussion. Those of ordinary skill in the art, using the disclosures provided herein, will understand that various steps of any of the methods provided herein can be adapted, modified, rearranged, performed simultaneously, include steps not illustrated, or expanded in various ways without deviating from the scope of the present disclosure.

At (602), the method includes obtaining data from one or more sensors associated with a utility pole sensing device. In some embodiments, the data can include, for instance, data from sensors 102, 104, and/or 106 illustrated in FIG. 2.

At (604), the method includes accessing data indicative of a historical baseline. The data indicative of the historical baseline can be determined based on averages and/or other computations performed on historical data collected by the utility pole sensing device or other data (e.g., data from other utility pole sensing devices).

At (606), the method can include identifying a deviation from the historical baseline. For instance, the method can identify when the data (e.g., accelerometer readings) deviates from the historical baseline beyond a specified threshold (e.g., for a period of time). At (608), the method can include identifying the event occurrence based at least in part on the deviation. For instance, an event occurrence can be identified when there is a deviation.

At (610), in some embodiments, the method can include classifying the event occurrence based on a magnitude of the deviation. As an example, event occurrences can be assigned priority levels based on the magnitude of the deviation. Deviations with greater magnitude can be classified as higher priority event occurrences relative to deviations with lesser magnitude.

FIG. 9 depicts a flow diagram of one example method (700) for processing data collected by a utility pole sensing device to identify an event occurrence according to example embodiments of the present disclosure. The method (700) can be implemented by one or more processors, such as locally by one or more processors at the utility pole sensing device, at a remote device (e.g., a cloud server), or can be shared across multiple devices (e.g., a plurality of utility pole sensing devices, user devices, cloud servers, etc.). FIG. 9 depicts steps performed in a particular order for purposes of illustrations and discussion. Those of ordinary skill in the art, using the disclosures provided herein, will understand that various steps of any of the methods provided herein can be adapted, modified, rearranged, performed simultaneously, include steps not illustrated, or expanded in various ways without deviating from the scope of the present disclosure.

At (702), the method includes obtaining data from one or more sensors associated with a utility pole sensing device. In some embodiments, the data can include, for instance, data from sensors 102, 104, and/or 106 illustrated in FIG. 2.

At (704), the method includes accessing data associated with other utility pole sensing devices for a comparative processing. In some embodiments, the other utility pole sensing devices can be proximate or adjacent utility pole sensing devices.

At (706), the method can include identifying a deviation from the data associated with the other utility pole sensing devices. For instance, the method can identify when the data (e.g., accelerometer readings) deviates from the data from other utility pole sensing devices beyond a specified threshold (e.g., for a period of time). At (708), the method can include identifying the event occurrence based at least in part on the deviation. For instance, an event occurrence can be identified when there is a deviation.

At (710), in some embodiments, the method can include classifying the event occurrence based on a magnitude of the deviation. As an example, event occurrences can be assigned priority levels based on the magnitude of the deviation. Deviations with greater magnitude can be classified as higher priority event occurrences relative to deviations with lesser magnitude.

Other comparative processing techniques based on data from other utility pole sensing devices can be implemented. For instance, data from a plurality of different utility pole sensing devices can be grouped to identify trends. Data from a plurality of different utility pole sensing devices can be processed to determine occurrences (e.g., natural disasters) with a specific geographic region. Other processing techniques can be used without deviating from the scope of the present disclosure.

One example aspect of the present disclosure is directed to a sensing system for support structure inspection. The system can include one or more sensors configured to obtain data associated with a condition of a support structure. The system can include one or more processors. The system can include a communication circuit operable to communicate a data packet to a remote device. The data packet can include a payload generated based at least in part on the data associated with the condition of the support structure. The system can include a power source operable to provide electrical power to the one or more sensors, one or more processors, and the communication circuit.

The one or more sensors can include at least one first sensor configured to obtain data indicative of a motion of a top portion of the support structure. The top portion of the support structure can be associated with a height at least greater than 50% of a total height of the support structure, such as at least greater than 75% of a total height of the support structure. The at least one first sensor can include one or more of an accelerometer, gyroscope, vibration sensor, or magnetic sensor.

The one or more sensors can include at least one second sensor configured to obtain data indicative of integrity associated with the support structure. The at least one second sensor can include an aluminum oxide moisture sensor. The at least one second sensor can include a probe moisture sensor. The at least one second sensor can include a moisture sensor configured to obtain data indicative of moisture associated with a bottom portion of the support structure. The bottom portion of the support structure can be associated with a height that is less than 50% of the total height of the support structure, such as less than 75% of the total height of the support structure.

The one or more sensors can include an environmental sensor configured to obtain data associated with an environment in which the support structure is located. The environmental sensor can include one or more of a microphone, a temperature sensor, a pressure sensor, a windspeed sensor, a lighting sensor, or a motion sensor.

The system can include a real time clock. The one or more processors can be configured to associate the data associated with the condition of the support structure with a time stamp from the real time clock. The power source can be operable to provide power to the real time clock. The one or more processors can be operable to implement a time correction routine to address drift of the real time clock. The payload can include the time stamp from the real time clock.

The one or more processors can be configured to perform one or more processing operations on the data associated with a condition of the support structure. The remote device can be configured to perform one or more processing operations on the data associated with the condition of the support structure.

The processing operations can include: identifying a threshold crossing based at least in part on the data associated with the condition of the support structure; and determining an event occurrence based at least in part on the threshold crossing.

The processing operations can include: identifying a deviation from a historical baseline based at least in part on the data associated with the condition of the support structure; and determining an event occurrence based at least in part on the deviation from the historical baseline.

The processing operations can include: determining a deviation from data associated with one or more different support structures based at least in part on the data associated with the condition of the support structure; and determining an event occurrence based at least in part on the deviation from the data associated with one or more different support structures.

In some instances, one or more different support structures can be located proximate to the support structure. The event occurrence can be indicative of vibrations, pole movement, pole twisting, pole tilting, pole singing, or pole rocking. The event occurrence can be indicative of diminished strength of the support structure.

The sensing system can be configured to communicate a notification based at least in part on the data associated with the condition of the support structure. The remote device is configured to communicate a notification based at least in part on the data associated with the condition of the support structure. The sensing system is configured to communicate a notification based at least in part on the event occurrence. The remote device can be configured to communicate a notification based at least in part on the event occurrence.

The payload can include an identifier for the support structure. The payload can include location information associated with the support structure.

The power source comprises an energy storage device. The energy storage device can include a battery. The power source can include a power harvesting circuit configured to charge the battery. The power harvesting system can be configured to harness one or more of solar energy, wind energy, piezoelectric energy, electromagnetic energy associated with power lines suspended by the support structure, or radio frequency energy.

The communication circuit can be operable to communicate the payload using a low power wide area network protocol. The protocol can include one or more of LoRaWAN, WiFi-ah (802.11ah), 3G, 4G, LTE, 5G, Sigfox, Ingenu, Digimesh, Synergize RF, or TWAC PLC.

The communication circuit can be operable to communicate the payload over a network. The network can be a mesh network. The network can include a different sensing system associated with a different support structure. The network can include one or more utility meters. The network can include a cellular network.

The communication circuit can be configured to communicate a payload at different time intervals. A frequency of the time intervals can be based at least in part on the data associated with the condition of the support structure.

The data associated with the condition of the support structure can include accelerometer data.

The one or more processors can be configured to execute a control action based at least in part on the data associated with the support structure. The control action can include communicating a request to discontinue power distribution using one or more conductors associated with the support structure.

In some embodiments, a utility pole sensing device can include a housing couplable to a utility pole. The utility pole sensing device can include one or more pole movement sensors configured to obtain data indicative of motion of a top portion of a utility pole. The utility pole sensing device can include one or more processors. The utility pole sensing device can include a communication circuit operable to communicate a data packet to a remote device. The data packet can include a payload generated based at least in part on the data associated with the condition of the utility pole. The utility pole sensing device can include a power source operable to provide electrical power to the one or more sensors, one or more processors, and the communication circuit.

The utility pole sensing device comprises a moisture sensor configured to obtain data indicative of moisture content at a bottom portion of the utility pole. The utility pole sensing device has one or more aspects of systems described herein.

In some embodiments, a method can include obtaining, by one or more processors, data indicative of a utility pole condition from one or more sensors associated with a utility pole sensing device mounted to a utility pole. The method can include processing, by the one or more processors, the data indicative of the utility pole condition to identify an event occurrence associated with the utility pole. The method can include providing, by the one or more processors, a notification associated with the event occurrence.

The method can include implementing a control action based at least in part on the event occurrence. The control action can include discontinuing power distribution along one or more conductors supported by the utility pole. The control action can include contacting a response entity to investigate the utility pole.

Processing the data indicative of the utility pole condition to identify an event occurrence associated with the utility pole can include identifying a threshold crossing based at least in part on the data associated with the condition of the utility pole; and determining an event occurrence based at least in part on the threshold crossing. The method can include classifying the event occurrence based at least in part on a magnitude of the threshold crossing.

Processing, by the one or more processors, the data indicative of the utility pole condition to identify an event occurrence associated with the utility pole can include identifying a deviation from a historical baseline based at least in part on the data associated with the condition of the utility pole; and determining an event occurrence based at least in part on the deviation from the historical baseline.

Processing, by the one or more processors, the data indicative of the utility pole condition to identify an event occurrence associated with the utility pole can include determining a deviation from data associated with one or more different utility poles based at least in part on the data associated with the condition of the utility pole; and determining an event occurrence based at least in part on the deviation from the data associated with one or more different utility poles. The method can include classifying the event occurrence based on a magnitude of the deviation.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A sensing system for support structure inspection, comprising:
   a first sensor situated at a first location at a top portion of a utility line support structure and configured to obtain data indicative of a first property of the support structure, wherein the first property is a motion of the top portion of the support structure;
   a second sensor positioned at a second location different from the first location, the second sensor measuring a second property different from the first property, wherein the second property is associated with the integrity of the support structure;
   an environmental sensor configured to obtain data associated with an environment in which the support structure is located;

one or more processors configured to obtain data from the first sensor, the second sensor and the environmental sensor;
a communication circuit operable to communicate a data packet to a remote device, the data packet including a payload generated based at least in part on the data from the first sensor, the second sensor and the environmental sensor; and
a power source operable to provide electrical power to the one or more processors and the communication circuit.

2. The sensing system of claim 1, wherein the top portion of the support structure is associated with a height at least greater than 50% of a total height of the support structure.

3. The sensing system of claim 1, wherein the first sensor comprises one or more of an accelerometer, gyroscope, vibration, or magnetic sensor.

4. The sensing system of claim 1, wherein second sensor comprises an aluminum oxide moisture sensor.

5. The sensing system of claim 1, wherein the second sensor comprises an impedance sensor.

6. The sensing system of claim 5, wherein the impedance sensor applies a test signal to the support structure at a plurality of different frequencies to obtain an impedance profile.

7. The sensing system of claim 1, wherein the second sensor comprises a moisture sensor configured to obtain data indicative of moisture associated with a bottom portion of the support structure.

8. The sensing system of claim 1, wherein the second sensor is positioned at a bottom portion of the support structure that is associated with a height that is less than 50% of a total height of the support structure.

9. The sensing system of claim 1, wherein the communication circuit is operable to communicate the payload using a low power wide area network protocol, wherein the protocol comprises one or more of LoRaWAN, WiFi-ah (802.11ah), 3G, 4G, LTE, 5G, Sigfox, Ingenu, Digimesh, Synergize RF, or TWAC PLC.

10. The sensing system of claim 1, wherein the environmental sensor comprises one or more of a microphone, a temperature sensor, a pressure sensor, a windspeed sensor, a lighting sensor, or a motion sensor.

11. The sensing system of claim 1, further comprising a real time clock, the one or more processors configured to associate the data associated with the condition of the support structure with a time stamp from the real time clock, wherein the payload comprises the time stamp from the real time clock.

12. The sensing system of claim 11, wherein the one or more processors are operable to implement a time correction routine to address drift of the real time clock.

13. A method, comprising:
obtaining, by one or more processors, first data indicative of a first property of a utility pole from a first sensor located at a first position, wherein the first property includes motion of a top portion of the utility pole, wherein the first position is located at the top portion of the utility pole, wherein data indicative of a utility pole condition includes second data indicative of integrity associated with a bottom portion of the utility pole from a second sensor of one or more sensors, wherein the second sensor is located at the bottom portion of the utility pole and is located external to a sensor housing;
obtaining, by the one or more processors, second data indicative of a second property different from the first property at a second location different from the first location, wherein the second property is associated with the integrity of the utility pole;
processing, by the one or more processors, data indicative of the utility pole condition based on the first and second data;
identifying, by the one or more processors, a threshold crossing based at least in part on the data associated with the condition of the utility pole;
determining, by the one or more processors, an event occurrence based at least in part on the threshold crossing;
classifying, by the one or more processors, the event based on the threshold crossing; and
providing, by the one or more processors, a notification associated with the event occurrence.

14. The method of claim 13, wherein classifying the event based on the threshold crossing includes assigning a priority level based on the magnitude of the threshold crossing.

15. The method of claim 13, wherein processing, by the one or more processors, the data indicative of the utility pole condition to identify an event occurrence associated with the utility pole comprises:
identifying a deviation from a historical baseline based at least in part on the data associated with the condition of the utility pole; and
determining an event occurrence based at least in part on the deviation from the historical baseline.

16. The method of claim 13, wherein processing, by the one or more processors, the data indicative of the utility pole condition to identify an event occurrence associated with the utility pole comprises:
determining a deviation from data associated with one or more different utility poles based at least in part on the data associated with the condition of the utility pole; and
determining an event occurrence based at least in part on the deviation from the data associated with one or more different utility poles.

17. The method of claim 13, further comprising implementing a control action based at least in part on the event occurrence.

18. The method of claim 17, wherein the control action includes discontinuing power distribution along one or more conductors supported by the utility pole; contacting a response entity to investigate the utility pole.

19. The method of claim 13,
wherein the second sensor includes an impedance sensor, and the second data includes impedance data indicative of impedance at the bottom of the utility pole,
wherein the processing includes processing the data indicative of the utility pole condition, based on the first data and on the second data including the impedance data, to identify the event occurrence associated with the utility pole, and
wherein the processing includes comparing the impedance data to an impedance profile created by applying a test signal to the utility pole at a plurality of different frequencies by the impedance sensor.

20. The sensing system of claim 13, further comprising obtaining, by the one or more processors, environmental data from an environmental sensor, and wherein the processing data indicative of the utility pole condition includes processing the environmental data.

* * * * *